United States Patent [19]

Ström

[11] 4,045,867
[45] Sept. 6, 1977

[54] METHOD FOR ENCAPSULATING ELECTRICAL COMPONENTS

[75] Inventor: Arne Gudmund Ström, Kalmar, Sweden

[73] Assignee: Telefonaktiebolaget L M Ericsson, Stockholm, Sweden

[21] Appl. No.: 604,438

[22] Filed: Aug. 13, 1975

[30] Foreign Application Priority Data

Sept. 19, 1974 Sweden .................................. 7411786

[51] Int. Cl.$^2$ .................. B29C 6/04; B29C 17/10; H01G 1/02; H01G 1/153
[52] U.S. Cl. .................................... 29/628; 29/25.42; 249/94; 264/102; 264/157; 264/272; 264/297
[58] Field of Search ............... 264/272, 157, 297, 102; 29/25.42, 588, 591, 628; 357/72; 228/179, 180 A; 249/94

[56] References Cited

U.S. PATENT DOCUMENTS

| | | | |
|---|---|---|---|
| 2,758,183 | 8/1956 | Canegallo | 264/272 |
| 2,856,639 | 10/1958 | Forrest et al. | 264/272 |
| 2,960,641 | 11/1960 | Cohen et al. | 264/272 |
| 3,141,049 | 7/1964 | Parsons | 264/272 |
| 3,261,902 | 7/1966 | Pearce et al. | 357/72 |
| 3,289,452 | 12/1966 | Kollner | 228/179 |
| 3,560,813 | 2/1971 | Phy | 357/72 |
| 3,731,371 | 5/1973 | Piper et al. | 228/179 |

FOREIGN PATENT DOCUMENTS

| | | | |
|---|---|---|---|
| 712,289 | 7/1954 | United Kingdom | 264/272 |

Primary Examiner—James B. Lowe
Attorney, Agent, or Firm—Hane, Baxley & Spiecens

[57] ABSTRACT

In a method for encapsulating electrical components, especially capacitors, plastic moulds joined to a common trough-shaped pouring ingate are used. A liquid, hardenable plastics filling compound is poured into the moulds in excess under vacuum, and the plastics compound is brought to cure. After curing, the pouring ingate together with the surplus filling compound is cut off from the encapsulated components. The mould remains as a cover around the component.

5 Claims, 4 Drawing Figures

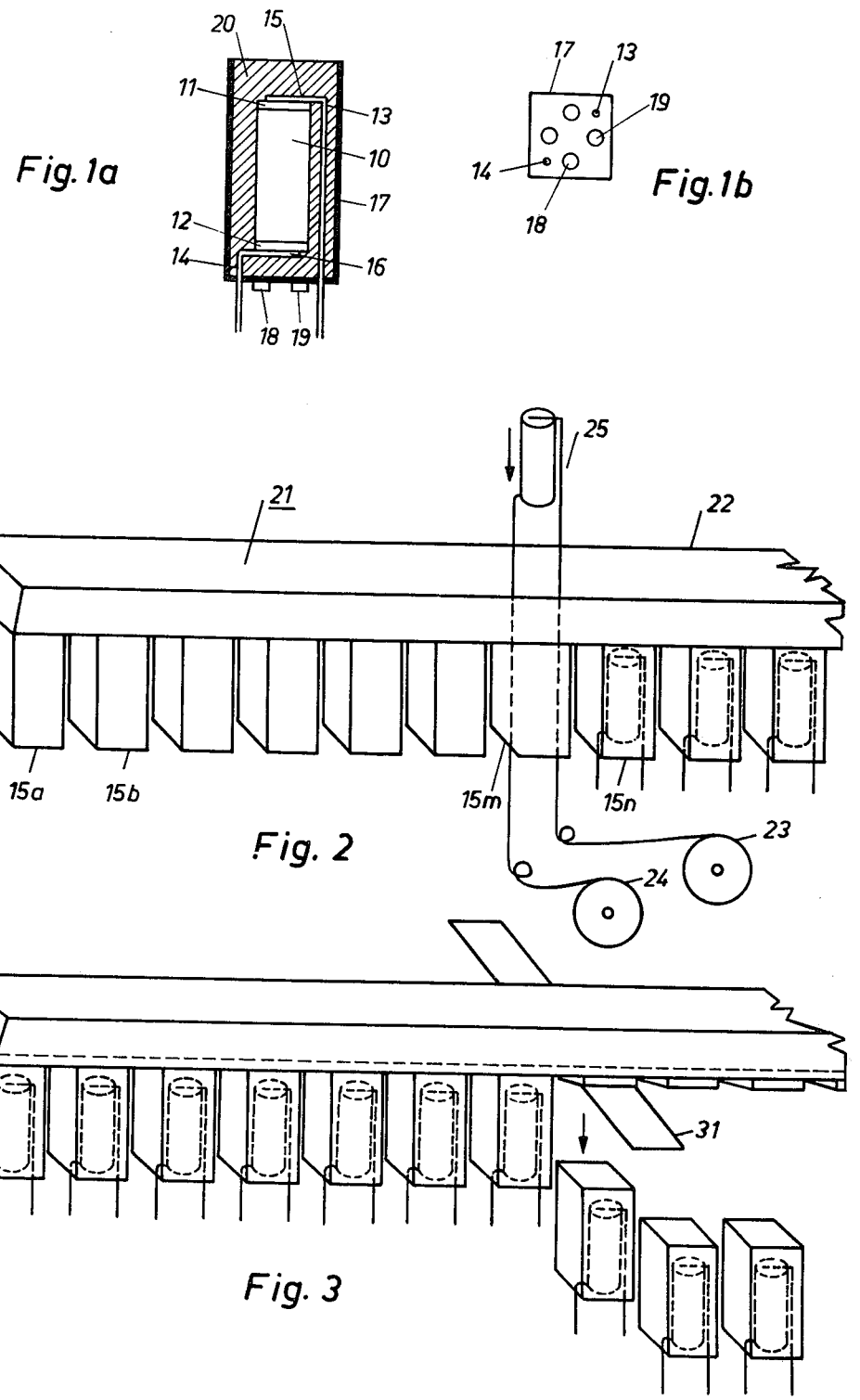

METHOD FOR ENCAPSULATING ELECTRICAL COMPONENTS

SUMMARY OF THE INVENTION

The present invention relates to a method for encapsulating electrical components in a hardenable plastics material within a mould that is left after the component is embedded, forming a cover. Furthermore, the invention relates to a mould designed for the method.

It is known how to encapsulate components, especially capacitors in hardenable plastics material, for instance expoxy resin. In these cases, the components have been placed in separate moulds, separately being filled with liquid plastics material and then cured. A very big problem when filling the moulds has been to dose the quantity of liquid plastics material to be filled in the different moulds owing to the fact that the components may have varying volumes. On account of that and on account of the shrinkage of the resin during the curing, it is often necessary to pour twice with an intermediate curing. When embedding a component in a liquid plastics material, it is hard to avoid air bubbles in the material. Usually these bubbles are eliminated by pouring under vacuum or by placing the mould in a vacuum after the filling. Separate moulds are difficult to fill in a vacuum, especially if they are small. Of course, a number of moulds has been brought together in a supporting frame in order to facilitate the handling, but the problem to center the pipe used for pouring still remains. When vacuum handling after the filling, the resin will overflow due to the expansion of the air bubbles.

When embedding components according to known methods, the connection wires have been turned upwards or they have been put through holes in the bottom of the mould. In the former case, there is a risk that the connection wires will be contaminated by the settable plastics material during the filling, and, furthermore, their mutual distance is not very well defined. In the latter case, these disadvantages are avoided, but then there is the problem of inserting the connection wires through the holes in the bottom of the mould. The connection wires must be fairly long, and there is a considerable wastage when they are cut to normal length.

BRIEF DESCRIPTION OF THE INVENTION

The invention will be described more in greater detail in connection with the appended drawing wherein FIG. 1a shows a diagonal section through and FIG. 1b shows a bottom view of an encapsulated capacitor made by means of the process of the invention, FIG. 2 shows a perspective sketch of a mould when inserting the components in their capsules, and FIG. 3 shows a perspective sketch of the mould during the operation when each encapsulated component is detached.

DETAILED DESCRIPTION OF THE INVENTION

In FIG. 1, 10 denotes a component, in this case a capacitor body. The capacitor body is provided with terminal contacts 11, 12 to which the bent parts 15, 16 of the connection wires 13, 14 are attached, for instance by soldering. The capacitor body 10 is placed in a capsule 17 made of plastics material, preferably a thermoplastics material with, sufficiently high softening point to manage the curing. In the bottom of the capsule, there are holes through which the lead-in wires are taken out. Furthermore, there are heads 18, 19 forming spacers that keep the component away from the printed circuit when assembling.

The capsule 17 is filled with a hardenable plastics material 20, for instance expoxy plastics, that fixes the capacitor body and the lead-in wires in the capsule and constitutes a mechanical and electrical protection.

A capacitor with this general design is known per se but is difficult to produce with known methods. FIGS. 2 and 3 illustrate a new method of producing an encapsulated component with this design and a mould used for the method. A mould 21 consists of a troughshaped pouring ingate 22 in the bottom of which there is a number of cavities forming moulds or capsules 15a, 15b . . . for the components. The pouring ingate and the capsules are produced in one piece, for instance of thermoplastic resin, by means of blow moulding or injection moulding. It is advisable that the thermoplastic used, for instance polypropylene, is relatively soft because then the holes may be somewhat undercalibrated or be provided with a thin cover. Then a certain sealing is obtained around the lead-in wires 13, 14.

The manufacturing process starts by pushing two lead-in wires 13, 14 from beneath into the holes in the bottom of the capsule as is shown at capsule 15 m. The wires are obtained from supply coils 23, 24. The lead-in wires 13, 14 are fed as far as somewhat above the pouring ingate 22. In this position 25 the wires are bent at an angle of 90°, 15, 16, and are attached to the terminal contacts 11, 12 of the capacitor body 10 by soldering or welding. Then the lead-in wires 13, 14 are pulled backwards until the capacitor body is in the proper position in the capsule and the lead-in wires are cut off to desired length as is shown at the capsule 15 n. When the capacitor bodies have been properly placed in all capsules in the mould this is placed under vacuum and a suitable hardenable plastics material is poured into the ingate 22. In order to fill all the capsules properly a surplus of hardenable plastics material is supplied so that a certain quantity remains in the ingate for example to the level 30 indicated in FIG. 3. After the refill, the hardenable plastics material is brought to cure preferably in heat. Finally, the ingate and superfluous parts of the capsules, if any, are cut away for instance with a saw blade 31, as is shown in FIG. 3. The method according to the invention is very appropriate for automatized production where the different moments being described above are performed in different stations in an automatic machine. Then, it can be convenient to form the mould as a long track.

We claim:

1. A method for encapsulating electrical components in capsules filled with a hardenable plastics material, said capsules being part of a mould having a trough-shaped pouring ingate mounted above and in fluid communication with the entrances of said capsules, said capsules being provided with holes in their bottom portions and being spaced from one another along said trough-shaped pouring ingate, each of said electrical components to be provided with a first electrical connection wire connected to a first terminal of said electrical component, and a second electrical connection wire connected to a second terminal of said electrical component, said method comprising: the steps of inserting said electrical components into said capsules such that the connection wires pass through the holes provided in the bottoms of the capsules, one electrical component for each of said capsules; pouring a liquid hardenable plastics material into said trough-shaped pouring ingate, said step of pouring comprising pouring a surplus amount of said liquid hardenable plastics material so that an excess amount of said material remains in said trough-shaped pouring ingate after all of said capsules have been filled, and pouring said material into said trough-shaped pouring ingate under vacuum; curing said liquid hardenable plastics material; and separating said trough-shaped pouring ingate along with the excess hardened plastics material from said thus-formed encapsulated components such that a plurality of individual encapsulated components results.

2. The method according to claim 1, wherein said step of inserting said electrical components into said capsules comprises inserting said first and second connection wires for each electrical component, prior to connection to said electircal component, through a first hole and a second hole in the bottom surface of a respective capsule, pushing said first and second connection wires through said holes until said connection wires are positioned above the top surface of said trough-shaped pouring ingate, bending the ends of said first and second connection wires positioned above said top surface of said trough-shaped pouring ingate, connecting said thus-bent ends of said first and second connection wires to said first and second terminals of the corresponding electrical component, and pulling said thus-connected first and second connection wires back through said first and second holes until said electrical component is in the proper position in its respective capsule.

3. The method according to claim 2, wherein said step of inserting said electrical components into said capsules further comprises cutting said first and second connection wires to a desired length after said step of pulling said thus-connected first and second connection wires back through said first and second holes.

4. The method according to claim 2, wherein said step of inserting said first and second connection wires into said respective capsules comprises advancing said connection wires from respective reels of connection wire positioned below said first and second holes of each capsule.

5. The method according to claim 4, wherein said step of separating said trough-shaped pouring ingate along with said excess material comprises cutting said trough-shaped pouring ingate along with said excess material from the top portions of said thus-formed encapsulated components.

* * * * *